United States Patent [19]

Higashi et al.

[11] Patent Number: 4,569,253

[45] Date of Patent: Feb. 11, 1986

[54] KICKDOWN CONTROL FOR A MOTOR VEHICLE AUTOMATIC TRANSMISSION WITH TWO STAGE KICKDOWN

[75] Inventors: Haruki Higashi; Kouichirou Waki; Masaru Fukuiri; Kazuo Yukitomo, all of Hiroshima, Japan

[73] Assignee: Mazda Motor Corporation, Hiroshima, Japan

[21] Appl. No.: 655,711

[22] Filed: Sep. 28, 1984

[30] Foreign Application Priority Data

Sep. 30, 1983 [JP] Japan ................. 58-183780

[51] Int. Cl.$^4$ ............................ B60K 41/06
[52] U.S. Cl. ........................ 74/866; 74/865; 74/871; 74/877
[58] Field of Search ............... 74/865, 866, 870, 871, 74/877; 364/424.1

[56] References Cited

U.S. PATENT DOCUMENTS

| | | | |
|---|---|---|---|
| 3,653,281 | 4/1972 | Shirai et al. | 74/866 X |
| 3,673,892 | 7/1972 | Kato et al. | 74/870 |
| 3,733,930 | 5/1973 | Mizote | 74/866 |
| 3,785,224 | 1/1974 | Will | 74/865 |
| 4,034,627 | 7/1977 | Mizote | 74/866 |
| 4,142,613 | 3/1979 | Iijima | 74/866 X |
| 4,369,676 | 1/1983 | Gaus | 74/870 X |
| 4,391,165 | 7/1983 | Gaus | 74/865 X |

FOREIGN PATENT DOCUMENTS

| | | | |
|---|---|---|---|
| 5653137 | 11/1978 | Japan. | |
| 2054772 | 2/1981 | United Kingdom | 74/870 |
| 2057602 | 4/1981 | United Kingdom. | |

Primary Examiner—William F. Pate, III
Assistant Examiner—Dwight G. Diehl
Attorney, Agent, or Firm—Fleit, Jacobson, Cohn & Price

[57] ABSTRACT

A vehicle automatic transmission including a torque converter, a multiple stage transmission gear mechanism connected with the torque converter and a hydraulic control circuit for automatically selecting one of gear stages of the transmission gear mechanism. The hydraulic control circuit includes a kickdown control device which functions to shift down the gear mechanism when the engine control foot pedal is substantially fully depressed. Depending on the vehicle running condition, the kickdown control device shifts down the gear mechanism by two gear stages. The hydraulic circuit includes control circuit which functions to shift down the gear mechanism at first by one gear stage and then by a further one stage in sequence when a two stage shift down is required.

7 Claims, 5 Drawing Figures

KICKDOWN CONTROL FOR A MOTOR VEHICLE AUTOMATIC TRANSMISSION WITH TWO STAGE KICKDOWN

BACKGROUND OF THE INVENTION

1. Field of the Invention

The present invention relates to a motor vehicle automatic transmission and more particularly to a control of a motor vehicle automatic transmission. More specifically, the present invention pertains to a control of an automatic transmission having a hydraulic torque converter and a multiple-stage transmission gear mechanism.

2. Description of Prior Art

Conventional automatic transmissions for motor vehicles include a torque converter and a multiple-stage transmission gear mechanism connected with the torque converter generally to be driven thereby. The gear mechanism generally has three forward drive stages and one reverse drive stage. In recent automatic transmissions such as the one disclosed by the published U.K. patent application 2,057,602, there is arranged an overdrive gear mechanism between the torque converter and the transmission gear mechanism so that an overdrive gear stage is additionally provided. The transmission is provided with a hydraulic control system for selecting an appropriate one of the gear stages in accordance with the vehicle operating conditions, such as the engine output and the vehicle speed.

As one of control modes performed by the control system, there is provided a kick-down control wherein the gear mechanism is shifted down to a lower gear stage when an engine control member such as an engine throttle valve actuating member is moved to a substantially full power position. In an automatic transmission having such kick-down control mode, there is a possibility that the gear mechanism be shifted down from the highest gear stage by two stages when the engine control member is actuated for a kick down control. Such two stage shift down is not preferable because there will be produced an uncomfortable shock. Japanese patent publication No. 56-53137 discloses a vehicle automatic transmission control system in which a two stage shift down is prevented. According to the control system proposed by the Japanese publication, when the manual shift lever is moved from the "D" position to the "2" position with the gear mechanism in the fourth or overdrive stage, the gear mechanism is at first shifted down to the third stage and then to the second stage. It should however be noted that the proposed control system deals only with the shift down control under an operation of the manual control lever so that it does not solve the problem of shift down shock under a kick down control.

OBJECT OF THE INVENTION

It is an object of the present invention to provide a vehicle automatic transmission control system which can prevent shift down shock in two stage shift down under a kick down control.

Another object of the present invention is to provide a vehicle automatic transmission control system in which gear stages are shifted down stepwise when two stage shift down is required.

A further object of the present invention is to provide vehicle automatic transmission control system which can carry out a kick down control for shifting down gear stages stepwisely under a vehicle speed lower than a predetermined value when two stage shift down is required.

Still further object of the present invention is to provide a vehicle automatic transmission including a transmission gear mechanism having a first through third gear stages and an overdrive gear stage, a control system for the gear mechanism having a kick down control mode in which shift down is carried out from the overdrive gear stage at first to the third gear stage and then to the second gear stage when it is required to shift down from the overdrive gear stage to the second gear stage.

SUMMARY OF THE INVENTION

According to the present invention, the above and other objects can be accomplished by a vehicle automatic transmission including a hydraulic torque converter, a transmission gear mechanism connected with the torque converter and having at least three gear stages of different gear ratios for forward drive, friction means for selecting one of said gear stages, kick down control means comprising first shift down circuit means for controlling said friction means so that the transmission gear mechanism is shifted down from a higher gear stage to a lower gear stage, kick down solenoid means provided in said first shift down circuit means for controlling said first shift down circuit means and kick down switch means adapted to be actuated by an engine control member when the engine control member is moved substantially to a full power position to thereby control said kick down solenoid means to effect a shift down from a higher gear stage to a lower gear stage, shift down control means comprising second shift down circuit means for controlling said friction means so that the transmission gear mechanism is shifted down from a higher gear stage to a next higher gear stage, shift down solenoid means provided in said second shift down circuit means for controlling said second shift down circuit means and shift down switch means adapted to be actuated by the engine control member when the engine control member is moved to a position spaced a predetermined distance from said full power position so that said shift down switch means is actuated earlier than said kick down switch means when the engine control member is moved toward said full power position to thereby control said shift down solenoid means to shift down from the higher gear stage to the next higher gear stage, vehicle speed detecting means for detecting vehicle speed and producing a vehicle speed signal, control means responsive to said vehicle speed signal for energizing the shift down solenoid means under a vehicle speed lower than a predetermined value when the shift down switch means is actuated and for energizing the kickdown solenoid means when the kickdown switch means is actuated, whereby a shift down is at first made under a vehicle speed lower than the predetermined value from a higher gear stage to a next higher gear stage and then to a lower gear stage when a two stage shift down is required for a kickdown control.

With the arrangements described above, when the gear mechanism is to be shifted down by two gear stages from a higher gear stage for kick down control, one stage shift down is at first made to the next higher gear stage and then a further one stage shift down is made. It is therefore possible to avoid any shock due to a two stage shift down.

In a preferable aspect of the present invention, the transmission gear mechanism comprises a multiple stage gear unit having at least three gear stages and an overdrive gear unit for providing an overdrive gear stage as the highest gear stage. In this arrangement, the two stage shift down may become necessary when the vehicle is running with the overdrive gear stage. The kickdown control means may be designed so that only one stage shift down is made when the vehicle is running with the speed higher than the predetermined value. Therefore, there may be no problem of two stage shift down shock under a high speed range.

BRIEF DESCRIPTION OF THE DRAWINGS

The above and other objects and features of the present invention will become apparent from the following descriptions of a preferred embodiment taking reference to the accompanying drawings, in which.

DESCRIPTION OF THE PREFERRED EMBODIMENT

Basic Structure of the Transmission

Figure 1:
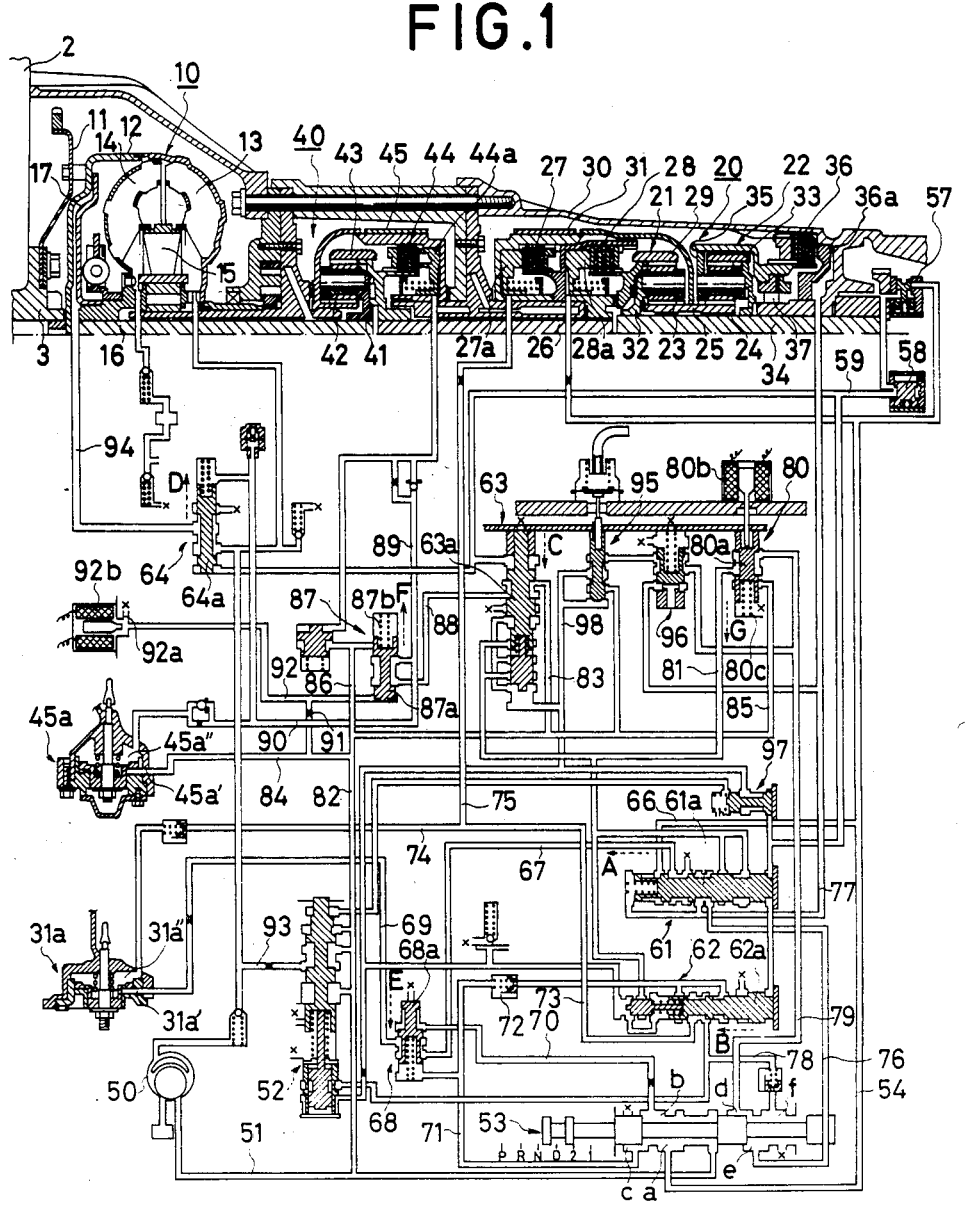
FIG. 1 is a sectional view of the vehicle automatic transmission embodying the features of the present invention.

Referring to the drawings, particularly to FIG. 1, there is shown an automatic transmission which comprises a hydraulic torque converter 10, a multiple stage transmission gear mechanism 20, and a planetary gear type over-drive transmission mechanism 40 arranged between the torque converter 10 and the multiple stage transmission gear mechanism 20.

The torque converter 10 has a pump 13 connected with an output shaft 3 of an engine 2 through a drive plate 11 and a converter casing 12, turbine 14 provided in the casing 12 to face to the pump 13 and a stator 15 disposed between the pump 13 and the turbine 14. A converter output shaft 16 is connected with the turbine 14. A lock-up clutch 17 is provided between the converter output shaft 16 and the casing 12 which is connected to the pump 13. The lock-up clutch 17 is normally engaged with the casing 12 under a pressure of hydraulic fluid which circulates in the torque converter 10, and is released by a hydraulic pressure, which is drawn to a space between the casing 12 and the clutch 17 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 though a connecting rod 25. The gear mechanism 20 has an input shaft 26 connected through a front clutch 27 with the connecting rod 25 and through a rear clutch 28 with an internal gear 29 of the front planetary gear unit 21. A front break 31 is provided between the connecting rod 25 or the sun gears 23, 24 of the gear units 21 and 22 and a casing 30 of the transmission. The gear mechanism 20 also has an output shaft 34 connected with a planetary carrier 32 of the front planetary gear unit 21 and an internal gear 33 of the rear planetary gear unit 22. The rear planetary gear unit 22 has a planetary carrier 35, and there are provided between the planetary carrier 35 and the transmission casing 30 rear brake 36 and a one-way clutch 37.

The planetary gear type over-drive transmission mechanism 40 includes planetary gears 41a, a planetary carrier 41 rotatably carrying the planetary gears 41a and connected with the output shaft 16 of the torque converter 10, a sun gear 42 engaged with the planetary gears 41a, and an internal gear 43 which is also engaged with the planetary gears 41a and connected with the sun gear 42 through a direct connecting clutch 44. An overdrive brake 45 is provided between the sun gear 42 and the transmission casing 30. The internal gear 43 is connected with the input shaft 26 of the multiple stage transmission gear mechanism 20.

The multiple stage transmission gear mechanism 20 is of a known type and can provide three forward driving gear stages and one reverse stage. The planetary gear type over-drive transmission mechanism 40 connects the shafts 16 and 26 directly when the direct connection clutch 44 is engaged and the brake 45 is released, and provides an over-drive connection between the shafts 16 and 26 when the brake 45 is engaged and the clutch 44 is released.

Hydraulic Control Circuit

The above-mentioned automatic transmission is provided with a hydraulic control circuit as shown in FIG. 1. The hydraulic control circuit has an oil pump 50 which is driven by the engine output shaft 3 through the torque converter 10. Hydraulic oil is discharged under pressure from the pump 50 into a pressure line 51. The oil pressure is reduced by a pressure regulating valve 52 and applied to a select valve 53. The select valve 53 has a plunger which can be selectively positioned in one of shift positions 1, 2 D, N, R and P. When the select valve 53 is positioned in the position D, the pressure line 51 is communicated with the ports a, b and c of the select valve 53. In the position 2, the pressure line 51 is communicated with the ports a, b and d of the select valve 53 whereas in the position 1, the line is communicated with the ports a, d and e. In the position R, the line 51 is communicated with the ports d, e and f. The port a is communicated through a line 54 with a hydraulic actuator 28a for the rear clutch 28. It will therefore be understand that when the select valve 53 is positioned in anyone of the positions D, 2 and 1, the actuator 28a makes the rear clutch 28 engage.

The line 54 from the port a is connected with a second governor valve 57 which is provided on the output shaft 34 of the transmission gear mechanism 20. The second governor valve 57 has an output port connected with a first governor valve 58 which is also provided on the output shaft 34. The first governor valve 58 has an output port connected with a governor pressure line 59. The governor valves 57 and 58 produce a governor pressure which is substantially proportional to the rotating speed of the output shaft 34. The governor pressure line 59 is connected with a 1-2 shift valve 61, a 2-3 shift valve 62, a 3-4 shift valve 63 and a lock-up valve 64 to apply the governor pressure to these vlaves so that spools 61a, 62a, 63a and 64a of these valves are forced respectively in the directions shown by arrows A, B, C and D.

The port a is also communicated through a line 66 branched from the line 54 with the 1-2 shift valve at a port which is communicated with a line 67 when the spool 61a is shifted in the direction of the arrow A under the governor pressure introduced at the right hand end of the spool 61a. The line 67 is led to a second lock valve 68 having a spool 68 having a spool 68a which is biased upward by means of a spring. With the select valve 53 in the position D, hydraulic pressure is applied from the ports b and c through lines 70 and 71 respectively to the second lock valve 68 and the hydraulic pressure functions to maintain the spool 68a in the upward position shown in FIG. 1. In this position of the spool 68a, the line 67 is communicated with line 69 leading to an engaging port 31a' of an actuator 31a for the front brake 31. It will thus be understood that when the spool 61a of the 1-2 shift valve 62 is moved in the direction shown by the arrow A, hydraulic presure is led to the engaging port 31a' of the actuator 31a to make the front brake 31 engage.

The line 71 from the port c of the select valve 53 is connected through an orifice check valve 72 with the 2-3 shift valve 62 at a port which is connected with a line 73 when the spool 62a is moved in the direction of the arrow B under the governor pressure applies to the right hand end of the spool 62a. The line 73 is branched to lines 74 and 75, the line 74 being conneted with a release port 31a" of the actuator 31a for the front brake 31 and the line 75 with an actuator 27a for the front clutch 27. It will therefore be understood that the front brake 31 is released and the front clutch 27 is engaged when the spool 62a of the 2-3 shift valve 62 is moved to the left position under the governer pressure.

The port c of the select valve 53 is disconnected from the pressure line 51 when the select valve 53 is in the position 2. Since the port b is still in communication with the pressure line 51, the spool 68a of the second lock valve 68 is moved in the direction shown by an arrow E to thereby connect the line 69 with the line 70. Thus, hydraulic pressure is introduced through the lines 70 and 69 to the engaging port 31a' of the actuator 31a to make the front brake 31 engage irrespective of the position of the spool 61a of the 1-2 shift valve 61.

The port e is communicated with the pressure line 51 when the select valve 53 is in either one of the positions 1 and R. The port e is connected through a line 76 to the 1-2 shift valve 61 at a port which is communicated with a line 77 when the spool 61a is in the right position as shown in FIG. 1. Thus, in this position of the spool 61a, the rear brake 36 is engaged under a hydraulic pressure applied through the line 77 to an actuator 36a.

The select valve 53 further has a port f which is communicated with the pressure line 51 when the select valve 53 is in the position R. The port f is connected through a line 78 with the 2-3 shift valve 62 at a port which is communicated with the line 73 when the spool 62a is in the right position shown in FIG. 1. Thus, hydraulic pressure is applied in the position R to the actuator 27a to engage the front clutch 27. The hydraulic pressure is also applied to the release port 31a" of the actuator 31a, however, the pressure does not provide any change in the actuator 31a because it is already in pressure at the engaging port 31a' in the position R of the select valve 53.

The port of which is in communication with the pressure line 51 in anyone of the position 2, 1 and R is connected with a line 79 leading to a kick donw valve 80. The valve 80 has a spool 80a which is viased upward by a spring 80c and actuated by a kick down solenoid 80b. In the upward position of the spool 80a, the valve 80 connects the line 79 with a line 81 which leads to the 1-2 shift valve 61, the 2-3 shift valve 62 and the 3-4 shift valve 63. When hydraulic pressure is applied from the line 81, spools 61a, 62a and 63a of the valves 61, 62 and 63 are maintained in the positions shown in FIG. 1.

The pressure line 51 is further connected with a branch line 82 which leads through lines 83, 84, 85 and 86 respectively to the 3-4 shift valve 63, an engaging port 45a' of an actuator 45a for the overdrive brake 45, the kick down valve 80 and an overdrive release valve 87. The line 83 leading to the 3-4 shift valve 63 is communicated through a line 88 with the overdrive release valve 87 when the spool 63a of the shift valve 63 is in the position shown in FIG. 1. The line 88 is communicated, when the spool 87a of the valve 87 is in the position shown in FIG. 1, through lines 89 and 90 respectively with an actuator 44a for the direct drive clutch 44 and a release porta 45a" of the actuator 45a for the overdrive brake 45. It will therefore be understood that, in the positions of the valves shown in FIG. 1, the direct drive clutch 44 is engaged and the overdrive brake 45 is released. When the spool 63a of the 3-4 shift valve 63 is moved in the direction of the arrow c under the governor pressure, the line 83 is disconnected from the line 88 and the line 88 is opened to the drain port. Therefore, the pressure is released from the actuator 44a and the release port 45a" of the actuator 45a so that the direct drive clutch 44 is released and the overdrive brake 45 is engaged.

The line 86 leading to the overdrive release valve 87 is normally closed by the spool 87a of the valve 87 as shown in FIG. 1. When the spool 87a is moved in the direction shown by an arrow F, the line 86 is communicated with the lines 89 and 90 to thereby engage the direct drive clutch 44 and relese the overdrive brake 45. In order to effect the aforementioned movement of the spool 87a, the line 84 is connected with the lower end portion of the spool 87a through a line 92 which has an orifice 91. The line 92 has a drain port 92a provided with normally open solenoid valve 92b. It will therefore be understood that the line 92 is normally opened to the drain port 92a so that the spool 87a of the valve 87 is held in the position shown in FIG. 1 under the influence of a spring 87b. When the solenoid valve 92b is energized to closed the drain port 92a, a pressure build up in the line 92 so that the spool 87a is shifted in the direction of the arrow F.

The line 85 leading to the kick down valve 80 is normally closed by the spool 80a of the valve 80. The spool 80a of the kick down valve 80 is shifted in the direction of an arrow G when the solenoid 80b is energized and in the shifted position of the spool 80a the line 85 is connected with the line 81. As already described, the line 81 is in communication with the line 79 from the port d of the select valve 53 when the solenoid 80b is de-energized. The port d is opened to the drain port when the select valve 53 is in the position D so that no pressure is built up in this instance in the line 81. When the solenoid valve 80b is energized, however, the pressure is supplied from the line 85 to the line 81 and the pressure functions to hold the spools 61a, 62a and 63a of the shift valves 61, 62 and 63 in the positions shown in FIG. 1 when the spools are in the illustrated positions. When anyone or all of the spools 61a, 62a and 63a are in the positions shifted in the directions of the arrows A, B and C, the pressure in the line 81 counteracts the governor pressure applied to the spools and moves the spools to the illustrated positions when the pressure in the line 81 overcomes the governor pressure.

The pressure regulating valve 52 has a port which is connected to a line 93 leading to the lock-up valve 64 having a spool 64a. With the spool 64a in the position shown in FIG. 1, the line 93 is connected with a line 94 to supply a hydraulic pressure to the torque converter 10 to thereby force the lock-up clutch 17 toward the released position. As already described, the governor pressure is applied through the line 59 to the lower end of the spool 64a. Further, the pressure in the line 90 is applied to the upper end of the spool 64a. It will therefore be understood that as the governor pressure increases beyond a predetermined value, it overcomes the force applied by the pressure in the line 90 and causes the spool 64a to move in the direction of the arrow D. Thus, the line 94 is disconnected from the line 93 and opened to the drawing port to thereby make the lock-up clutch 17 engage.

The hydraulic system further includes a vacuum throttle valve 95 for producing a throttle pressure which corresponds to the opening of the engine throttle valve. Further, there is provided & throttle back-up valve 96 for supplementing the vacuum throttle valve 95 and a pressure modifier valve 97 for modifying the output pressure of the valve 52. The throttle pressure from the valve 95 is led through a line 98 to the 2-3 shift valve 62 and the 3-4 shift valve 63 to force the spools 62a and 63a in the valves 62 and 63 in the directions opposite to the arrows B and C. In the structure described above, the relationship between the gear stages and the operations of the clutches 27, 28, 37 and 44 and the brakes 31, 36 and 45 is shown in Table.

Figure 2:
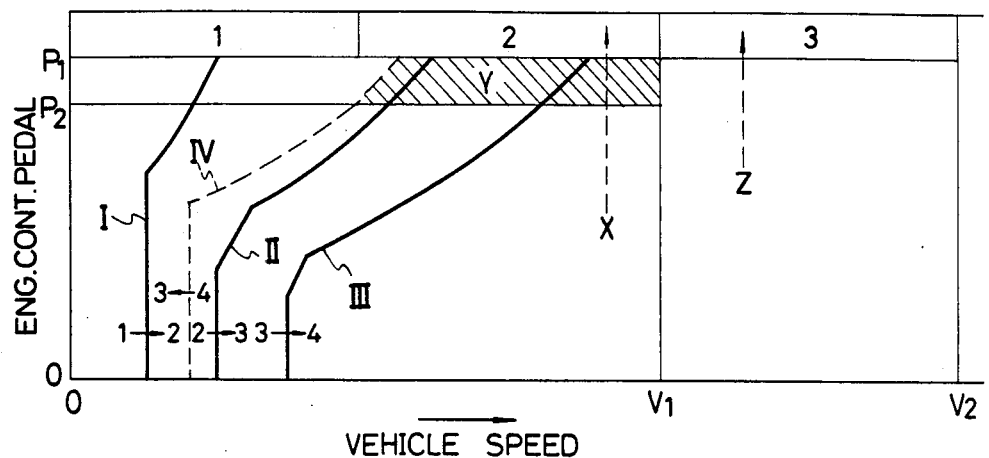
FIG. 2 is a diagram showing gear shift ranges as functions of the position of the engine control member and the vehicle speed.

In FIG. 2, there are shown shift lines wherein shiftings of gear stages are carried out. the solid line I designates the engine throttle valve opening P and the vehicle speed V wherein the transmission gear mechanism is shifted up from the first stage to the second stage. The solid lines II and III designate the shift up lines from the second to third and from the third to fourth stages, respectively. The dotted line IV designated the shift down line from the fourth stage to the third stage. Although not shown in the drawings, there are provided further shift down lines for shifting down from the third stage to the second stage and from the second stage to the first stage. The regions desingated by 1, 2 and 3 are kick down zones wherein the gear mechanism is shifted down respectively to the first, second and third stages.

Kick Down Control Electric Circuit.

Figure 4:
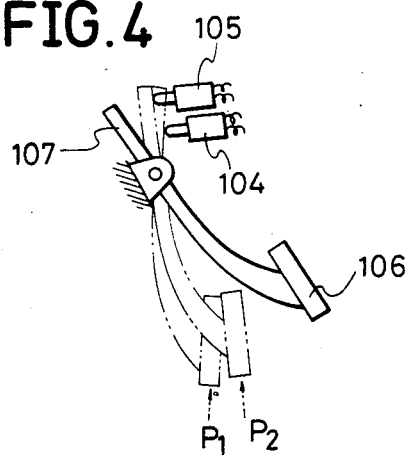
FIG. 4 is a side view showing arrangements of the engine control foot pedal and a shift down the kick down switches adapted to be actuated thereby; and, FIG. 5 is a diagram showing an operation of the electric circuit shows in FIG. 3.
Figure 3:
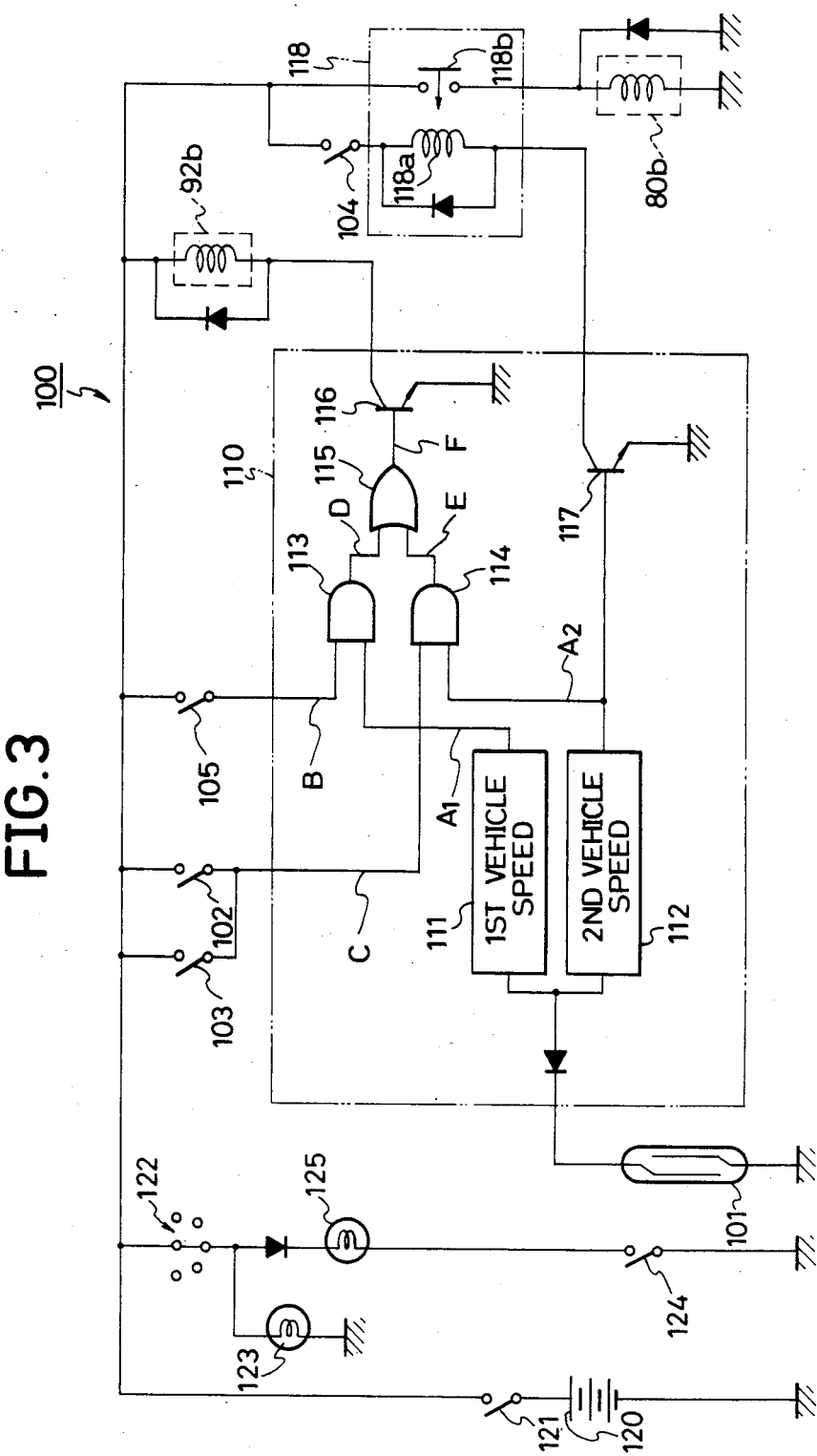
FIG. 3 is a circuit diagram showing the electric circuit for controlling the hydraulic circuit shown in FIG. 1.

Referring to FIG. 3, there is shown an electric control circuit 100 including a fourth gear stage switch 124 which is adapted to be closed when the transmission gear mechanism is in the fourth stage, a vehicle speed sensor 101 for detecting the vehicle speed, an engine cooling water temperature switch 102 which closes when the engine cooling water is below a predetermined temperature, an overdrive release switch 103 for manually releasing the overdrive, a kickdown switch 104 and a shift down switch 105. As shown in FIG. 4, the kickdown switch 104 and the shift down switch 105 are arranged so that they are actuated by an extension 107 of an engine control foot pedal 106. The kickdown switch 104 is positioned so that it is closed when the foot pedal 106 is depressed to a substantially full stroke position $P_1$ which may correspond to an engine throttle valve opening greater than $\frac{7}{8}$ of a full opening of the engine throttle valve. The shift down switch 105 is positioned so that it is closed at a position $P_2$ of the foot pedal 106 which is smaller in the stroke of the foot pedal 106 by a predetermined distance than the position $P_1$. For example, the position $P_2$ may correspond to a throttle opening of approximately 6/8 of the full opening.

Figure 5:
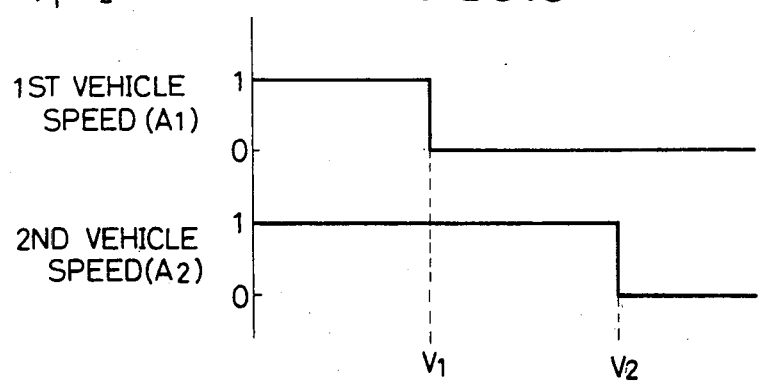

The control circuit 100 has a control section 110 which includes a first vehicle speed discriminating circuit 111 and a second vehicle speed discriminating circuit 112 both connected with the vehicle speed sensor 101 to receive a signal therefrom for producing vehicle speed signals $A_1$ and $A_2$, respectively. As shown in FIG. 5, the signal $A_1$ turns to a high level when the vehicle speed is below a first predetermined value $V_1$, for example, 100 km/h whereas the signal $A_2$ turns to a high level when the vehicle speed is below a second predetermined value $V_2$, for example, 155 km/h. The vehicle speed signal $A_1$ from the circuit 111 is applied to one of input terminals of an AND circuit 113. The other input terminal of the AND circuit 113 is connected through the shift down switch 105 and a main switch 121 with an electric power source 120 to receive a signal B. The AND circuit 113 produces an output signal D which turns to high level when the shift down switch 105 is closed and the vehicle speed is lower than the aforementioned predetermined value. The vehicle speed signal $A_2$ from the circuit 112 is applied to one of input terminals of an AND circuit 114. The other input terminal of the AND circuit 114 is connected through the parallelly connected switches 102 and 103 to the main switch 121 to receive a signal C. The AND circuit 114 produces and output signal E which turns to high level when either of the switches 102 and 103 is closed and the vehicle speed is below the second predeter-

TABLE

| SELECT VALVE | GEAR STAGE | FRONT CLUTCH 27 | REAR CLUTCH 28 | FRONT BRAKE 31 | REAR BRAKE 36 | ONE-WAY CLUTCH 37 | DIRECT DRIVE CLUTCH 44 | OVERDRIVE BRAKE 45 |
|---|---|---|---|---|---|---|---|---|
| P |   |   |   |   |   |   | o |   |
| R |   | o |   |   | o |   | o |   |
| N |   |   |   |   |   |   | o |   |
| D | 1 |   | o |   |   | o | o |   |
|   | 2 |   | o | o |   |   | o |   |
|   | 3 | o | o |   |   |   | o |   |
|   | 4 | o | o |   |   |   |   | o |
| 2 |   |   | o | o |   |   | o |   |
| 1 | 1 |   | o |   | o |   | o |   |
|   | 2 |   | o | o |   |   | o |   | mined value $V_2$. The outputs of the AND circuits 113 and 114 are connected with input terminals of an OR circuit 115. It will therefore be understood that when the engine cooling water temperature is below the aforementioned predetermined value or when the overdrive release switch 103 is actuated under a vehicle speed lower than the predetermined value $V_2$, a high level signal E is applied to the OR circuit 115. Further, the OR circuit 115 receives a high level signal D when the shift down switch 105 is closed under a vehicle speed lower than the value $V_1$.

The OR circuit 115 produces an output which turns to high level when one or both of the input terminals receive high level signals. The output of the OR circuit 115 is connected with the base of a transistor 116 which has a collector connected with the overdrive release solenoid 92b. The emitter of the transistor 116 is grounded so that the transistor turns on when a high level signal is applied from the OR circuit 115 to the base of the transistor 116. It will therefore be understood that, when the engine coolng water temperature is below the predetermined value or when the overdrive release switch 103 is actuated under a vehicle speed lower than the second predetermined value $V_2$, the overdrive release solenoid 92b is energized to release the overdrive clutch 17. The solenoid 92b is also energized when the shift down switch 105 is closed and the vehicle speed is below the first predetermined value $V_1$.

The main switch 121 is connected with an overdrive indicator light 125 through a D range switch 122 which is closed when the select valve 53 is in the position D. A D range indicating light 123 is connected with the switch 122. The overdrive indicator light 125 is grounded through the fourth gear stage switch 124.

The output of the second vehicle speed discriminating circuit 112 is connected with the base of a transistor 117. There is provided a relay 118 which is connected through the main switch 121 with the power source 120. The relay 118 a relay solenoid 118a connected at one end through the kick down switch 104 to the main switch 121 and at the other end to the collector of the transistor 117 of which emitter is grounded. The relay 118 has a relay contact 118b which is closed when the relay solenoid 118a is energized. The kickdown solenoid 80b is connected with the relay 118 so that it is energized when the relay contact 118b is closed. The transistor 117 is turned on when a high level signal is received from the circuit 112.

Operation

Assuming that the vehicle is running at a speed lower than the predetermined value $V_1$ with the gear mechanism at the fourth stage and the engine control foot pedal 106 is depressed to a substantially full stroke position, the shift down switch 105 is at first closed and then the kickdown switch 104 is closed. The vehicle operating zone is then shifted from the fourth stage zone to the second stage kickdown zone as shown by an arrow X in FIG. 2. At this time, when the engine control pedal 106 is moved to a position between the positions $P_2$ and $P_1$ a shown by a shadowed zone Y in FIG. 2, the switch 105 is closed so that the output D of the AND circuit 113 is turned to high level so that the output F of the OR circuit 115 is also turned to high level to make the transistor 116 conductive. Thus, the overdrive release solenoid 92b is energized and the gear mechanism is shifted down to the third stage.

At this instance, the output signal A2 from the circuit 112 is at high level so that the transistor 117 is already turned on. The kickdown switch 104 is closed after the shift down switch 105 is closed. As soon as the kickdown switch 104 is closed, the kickdown solenoid 80b is energized so that the gear mechanism is shifted down to the second stage. It will therefore be understood that, in a kickdown operation from the fourth gear stage to the second gear stage, the gear mechanism is at first brought to the third gear stage so that a shift down shock can be prevented. When the engine control foot pedal 106 is held at a position between the positions $P_1$ and $P_2$, the gear mechanism is maintained at the third stage as shown by a shadowed zone Y in FIG. 2.

When the vehicle speed is higher than the value $V_1$, the AND circuit 113 receives a low level input from the circuit 111 so that the output D is maintained at low level even when the switch 105 is closed. Therefore, the OR circuit 115 produces a low level output F as far as the engine cooling water temperature is high and the overdrive release switch 103 is not actuated. Thus, the overdrive release solenoid 92b is maintained in the de-energized condition. The output A2 of the circuit 112 is at high level as long as the vehicle speed is lower than the second value $V_2$. The transistor 117 is therefore maintained in the conductive state, so that the kickdown solenoid 80b is energized when the kickdown switch 104 is closed. Thus, the gear mechanism is shifted down from the fourth stage to the third stage as shown by an arrow z in FIG. 2. With the vehicle speed between the speeds $V_1$ and $V_2$, there will be no possibility that the gear mechanism be shifted down to the second stage because a higher gear stage is always required for maintaining the speed. Under the vehicle speed higher than the second predetermined value $V_2$, any shift down is not carried out because the vehicle speed is so high that the foot pedal 106 must be fully depressed and the highest gear stage must be held for maintaining the speed.

The invention has thus been shown and described with reference to a specific embodiment, however, it should be noted that the invention is in no way limited to the details of the illustrated arrangements but changes and modifications may be made without departing from the scope of the appended claims.

We claim:

1. A vehicle automatic transmission including a hydraulic torque converter, a transmission gear mechanism connected with the torque converter and having at least three gear stages of different gear ratios for forward drive, friction means for selecting one of said gear stages, kick down control means comprising first shift down circuit means for controlling said friction means so that the transmission gear mechanism is shifted down from a high gear stage to a lower gear stage, kick down solenoid means provided in said first shift down circuit means for controlling said first shift down circuit means and kick down switch means adapted to be actuated by an engine control member when the engine control member is moved substantially to a full power position to thereby control said kick down solenoid means to effect a shift down from a high gear stage to a lower gear stage, shift down control means comprising second shift down circuit means for controlling said friction means so that the transmission gear mechanism is shifted down from a high gear stage to a an adjacent lower gear stage, shift down solenoid means provided in said second shift down circuit means for controlling said second shift down circuit means and shift down switch means adapted to be actuated by the engine control member when the engine control member is moved to a position spaced a predetermined distance from said full power position so that said shift down switch means is actuated earlier than said kick down switch means when the engine control member is moved toward said full power position to thereby control said shift down solenoid means to shift down from a high gear stage to a next adjacent lower gear stage, vehicle speed detecting means for detecting vehicle speed and producing a vehicle speed signal, control means responsive to said vehicle speed signal for energizing the shift down solenoid means at a vehicle speed lower than a predetermined value when the shift down switch means is actuated and for energizing the kickdown solenoid means when the kickdown switch means is actuated, whereby a first shift down is made at a vehicle speed lower than a predetermined valve from a high gear stage to a lower, intermediate gear stage and then a second shift down is made from the intermediate gear stage to a next lower gear stage when a two stage shift down is required to effect kickdown control.

2. A transmission in accordance with claim 1 in which said vehicle speed detecting means includes vehicle speed discriminating means for producing a high level signal when the vehicle speed is lower than the predetermined value and a low level signal when the vehicle speed is higher than the predetemined value, AND gate means being provided and having inputs connected with said shift down switch means and said vehicle speed discriminating means, said AND gate means produclng a signal when the vehicle speed is lower than the predetermined value said shift down switch means is actuated to energize said shift down solenoid means.

3. A transmission in accordance with claim 2 which further includes second vehicle speed discriminating means for producing a high level signal when the vehicle speed is lower than a second predetermined value which is higher than the first predetermined value, OR gate means being provided for receiving outputs from said AND gate means and a further gate means which does not produce a high level signal at least when the high level signal is produced from the second vehicle speed discriminating means to produce a high level signal to energize said shift down solenoid means when a high level signal is received from at least one of said AND gate means and said further gate means.

4. A vehicle automatic transmission including a hydraulic torque converter, a transmission gear mechanism hydraulic torque converter, a transmission gear mechanism connected with the torque converter and having at least three gear stages of different gear ratios for forward drive, gear stage selecting means for selecting one of the gear stages, control means comprising first detecting means responsive to an engine control member for detecting that the engine control member is moved substantially to a full power position and producing a first signal, first shift down means responsive to said first signal for controlling said gear stage selecting means to shift down the transmission gear mechanism from a high gear stage to a lower gear stage, second detecting means responsive to the engine control member for detecting that the engine control member is moved to a position spaced a predetermined distance from said full power position and producing a second signal, vehicle speed detecting means for detecting that vehicle speed is below a predetermined value and producing a vehicle speed signal in response thereto, second shift down means responsive to said second signal and said vehicle speed signal for controlling said gear stage selecting means to shift down the transmission gear mechanism from a high gear stage to a next adjacent lower gear stage.

5. A transmission in accordance with claim 4 which further includes second vehicle speed detecting means for detecting that the vehicle speed is below a second predetermined value which is higher than the first predetermined value, shiftdown prohibiting means responsive to output of said second vehicle speed detecting means to prohibit shift down from a high gear stage when the vehicle speed is higher than the second predetermined value.

6. A transmission in accordance with claim 4 in which said first detecting means and said first shift down means constitute kick down means.

7. A vehicle automatic transmission including a hydraulic torque converter, a transmission gear mechanism connected with the torque converter and having at least three gear stages of different gear ratios for forward drive, gear stage selecting means for selecting one of the gear stages, control means comprising first detecting means responsive to an engine control member for detecting that the engine control member is moved substantially to a full power position and producing a first signal, first shift down means responsive to said first signal for controlling said gear stage selecting means to shift down the transmission gear mechanism from a high gear stage to a lower gear stage, second detecting means responsive to the engine control member for detecting that the engine control member is moved to a position spaced a predetermined distance from said full power position and producing a second signal, second shift down means responsive to said second signal for controlling said gear stage selecting means to shift down the transmission gear mechanism by one gear stage, control means for operating the second shift down means when the second signal is produced and for operating the first shift down means when the first signal is produced to effect a shift down to a further lower gear stage.

* * * * *